(12) United States Patent
Ye et al.

(10) Patent No.: US 10,474,749 B2
(45) Date of Patent: Nov. 12, 2019

(54) METHOD AND DEVICE FOR GENERATING LIVE TEXT BROADCASTING CONTENT USING HISTORICAL BROADCASTING TEXT

(71) Applicant: Alibaba Group Holding Limited, Grand Cayman (KY)

(72) Inventors: Zhou Ye, Hangzhou (CN); Yu Wang, Hangzhou (CN); Fan Chen, Hangzhou (CN); Yang Yang, Hangzhou (CN); Jiqiu Xu, Hangzhou (CN); Zhisong Fu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/752,956

(22) PCT Filed: Aug. 9, 2016

(86) PCT No.: PCT/CN2016/094115
§ 371 (c)(1),
(2) Date: Feb. 15, 2018

(87) PCT Pub. No.: WO2017/028706
PCT Pub. Date: Feb. 23, 2017

(65) Prior Publication Data
US 2018/0239750 A1      Aug. 23, 2018

(30) Foreign Application Priority Data
Aug. 18, 2015   (CN) .......................... 2015 1 0507932

(51) Int. Cl.
*G06F 17/27*        (2006.01)
*G06F 16/335*      (2019.01)
(Continued)

(52) U.S. Cl.
CPC ........ *G06F 17/2705* (2013.01); *G06F 16/337* (2019.01); *G06F 16/3334* (2019.01);
(Continued)

(58) Field of Classification Search
CPC ............... G06F 17/2705; G06F 16/337; G06F 16/3334; G06F 16/00; G06F 17/2785;
(Continued)

(56) References Cited

U.S. PATENT DOCUMENTS 6,976,031 B1   12/2005   Toupal et al.
7,333,967 B1    2/2008   Bringsjord et al.
(Continued)

FOREIGN PATENT DOCUMENTS

CN   101795287 A   4/2010
CN   101730009 A   6/2010
(Continued)

OTHER PUBLICATIONS

Qiao, Wei; "Research on the Language and Expression of Text Live Broadcast on Football on Domestic Portal Websites," Graduation Thesis for Master's Degree, May 20, 2014 (May 20, 2014).
(Continued)

*Primary Examiner* — Quynh H Nguyen
(74) *Attorney, Agent, or Firm* — James J. DeCarlo; Greenberg Traurig, LLP (57) ABSTRACT

The disclosed embodiments provide a method and device for live text broadcasting of a match. The method for live text broadcasting of a match comprises: receiving match data for a current match in real time; generating real-time utterances for live broadcasting used for describing the current match data with more human-like sentiment according to historical live broadcasting utterances used for describing match data in historical matches with human-like sentiment; and outputting the real-time live broadcasting utterances. The dis-
(Continued)

closed embodiments can conduct live text broadcasting of a match with human-like cadence, thus improving the quality of the live text broadcasting of a match.

20 Claims, 5 Drawing Sheets (51) Int. Cl.
*G06F 16/33* (2019.01)
*H04N 7/025* (2006.01)
*H04N 21/488* (2011.01)
*H04N 21/235* (2011.01)
*H04N 21/439* (2011.01)
*H04N 21/81* (2011.01)
*H04H 60/07* (2008.01)
*H04N 21/2187* (2011.01)

(52) U.S. Cl.
CPC ......... *G06F 17/2785* (2013.01); *H04H 60/07* (2013.01); *H04N 7/025* (2013.01); *H04N 21/2353* (2013.01); *H04N 21/4394* (2013.01); *H04N 21/4884* (2013.01); *H04N 21/4888* (2013.01); *H04N 21/8133* (2013.01); *H04N 21/2187* (2013.01)

(58) Field of Classification Search
CPC .... H04H 60/07; H04N 7/025; H04N 21/2353; H04N 21/4394; H04N 21/4884; H04N 21/4888; H04N 21/8133; H04N 21/2187
USPC .......................................................... 704/9
See application file for complete search history.

(56) References Cited

U.S. PATENT DOCUMENTS

| | | |
|---|---|---|
| 7,856,390 B2 | 12/2010 | Schiller |
| 7,933,958 B2 | 4/2011 | Carr et al. |
| 8,355,903 B1 | 1/2013 | Birnbaum et al. |
| 8,374,848 B1 | 2/2013 | Birnbaum et al. |
| 8,515,737 B2 | 8/2013 | Allen |
| 9,094,615 B2 | 7/2015 | Aman et al. |
| 9,146,904 B2 | 9/2015 | Allen |
| 9,509,758 B2 | 11/2016 | Broz et al. |
| 9,535,879 B2 | 1/2017 | Allen |
| 2003/0056116 A1 | 3/2003 | Bunker et al. |
| 2005/0210512 A1 | 9/2005 | Anderson, Jr. et al. |
| 2005/0273503 A1 | 12/2005 | Carr et al. |
| 2008/0043089 A1 | 2/2008 | Auerbach et al. |
| 2008/0193101 A1 | 8/2008 | Agnihotri et al. |
| 2009/0144785 A1 | 6/2009 | Walker et al. |
| 2009/0326948 A1 | 12/2009 | Agarwal et al. |
| 2010/0049852 A1 | 2/2010 | Whitnah et al. |
| 2010/0132049 A1 | 5/2010 | Vernal et al. |
| 2010/0299324 A1 | 11/2010 | Truve et al. |
| 2011/0087486 A1 | 4/2011 | Schiller |
| 2012/0079004 A1 | 3/2012 | Herman |
| 2012/0284755 A1* | 11/2012 | Keret ................. H04N 21/2187 725/62 |
| 2013/0346867 A1 | 12/2013 | Woods et al. |
| 2014/0082645 A1 | 3/2014 | Stern et al. |
| 2014/0344353 A1 | 11/2014 | Broz et al. |
| 2015/0297949 A1 | 10/2015 | Aman et al. |
| 2018/0192164 A1* | 7/2018 | Loheide ............. H04N 21/8455 |

FOREIGN PATENT DOCUMENTS

| | | |
|---|---|---|
| CN | 102929861 A | 2/2013 |
| JP | 10322233 A | 4/1998 |
| KR | 20090075426 A | 7/2009 |

OTHER PUBLICATIONS

International Search Report to corresponding International Application No. PCT/CN2016/094115, dated Nov. 4, 2016 (2 pages).

* cited by examiner

METHOD AND DEVICE FOR GENERATING LIVE TEXT BROADCASTING CONTENT USING HISTORICAL BROADCASTING TEXT

CROSS-REFERENCE TO RELATED APPLICATIONS

This application claims priority to Chinese Patent Application No. 201510507932.X, filed on Aug. 18, 2015 entitled "METHOD AND DEVICE FOR LIVE TEXT BROADCASTING OF MATCH," and PCT Appl. No. PCT/CN16/94115 filed on Aug. 9, 2016 entitled "METHOD AND DEVICE FOR LIVE TEXT BROADCASTING OF MATCH," each incorporated herein by reference in their entirety.

BACKGROUND

Technical Field

The disclosed embodiments relate to the field of Internet technologies, and in particular, to a method and device for conducting live text broadcasting of a match.

Description of the Related Art

With the development of Internet technologies, applications that use live text broadcasting for sporting events on user terminals (e.g., mobile phones, tablet computers, etc.) have emerged, such as the HUPU APP. Currently, two methods of live text broadcasting are available: one is manual typing-based live text broadcasting, and the other is machine-based live text broadcasting. Compared with the manual typing-based live text broadcasting method, the machine-based live text broadcasting method is widely used as it saves human resources and has higher live broadcasting efficiency. However, the machine-based live text broadcasting method simply provides factual statements for matches. For example, "2015-05-28 10:15:19, WARRIORS® vs. ROCKETS®, Curry, three-point shot, goal." Currently, this live broadcasting method is plain and dull. Users rarely view such that live broadcasting matches and the quality of live broadcasting is relatively poor.

SUMMARY

Multiple aspects of the disclosed embodiments provide a method and device for conducting live text broadcasting of a match with human-like cadence, thereby improving the quality of the live text broadcasting of a match.

One aspect of the disclosed embodiments provides a method for live text broadcasting of a match, comprising: receiving match data for a current match in real time; generating real-time utterances for live broadcasting used for describing the current match data with more human-like sentiment according to historical live broadcasting utterances used for describing match data in historical matches with human-like sentiment; and outputting the real-time utterances for live broadcasting.

Another aspect of the disclosed embodiments provides a method for processing live broadcasting utterances for a match, comprising: acquiring historical live broadcasting utterances with human-like sentiment used during live text broadcasting for match data in historical matches; and conducting topic marking and sentiment grading on the historical live broadcasting utterances according to actions and action results of the match described by the historical live broadcasting utterances.

Yet another aspect of the disclosed embodiments provides a device for live text broadcasting of a match, comprising: a receiving module, configured to receiving match data for a current match in real time; a generation module, configured to generate real-time utterances for live broadcasting used for describing the current match data with more human-like sentiment according to historical live broadcasting utterances used for describing match data in historical matches with human-like sentiment; and an output module, configured to output the real-time utterances for live broadcasting.

Still yet another aspect of the disclosed embodiments provides a device for processing live broadcasting utterances for a match, comprising: an acquisition module, configured to acquire historical live broadcasting utterances with human-like sentiment used during live text broadcasting for match data in historical matches; and a marking and grading module, configured to conduct topic marking and sentiment grading on the historical live broadcasting utterances according to actions and action results of the match described by the historical live broadcasting utterances.

The disclosed embodiments enable live text broadcasting for a current match by receiving match data for a current match in real time; generating real-time utterances for live broadcasting used for describing the current match data with more human-like sentiment according to historical live broadcasting utterances used for describing match data in historical matches with human-like sentiment, and outputting the real-time live broadcasting utterances. Because the disclosed embodiments use live broadcasting utterances with human-like sentiment, the live text broadcasting for a current match is provided with human-like cadence effect, thus improving the quality of the live text broadcasting of a match.

BRIEF DESCRIPTION OF THE DRAWINGS

To illustrate the technical solutions in the disclosed embodiments more clearly, the drawings which need to be used in the description of the embodiments or the prior art will be introduced briefly below. The drawings described below are merely some embodiments of the disclosed embodiments, and those of ordinary skill in the art can also obtain other drawings according to these drawings without making creative efforts.

DETAILED DESCRIPTION

To make the purposes, technical schemes, and advantages of the disclosed embodiments clearer, the technical schemes in the embodiments will be clearly and fully described below with reference to the drawings. The described embodiments are part of the embodiments of the disclosure, rather than all the embodiments. Based on the disclosed embodiments, all other embodiments obtained by those skilled in the art without making creative efforts fall within the protection scope of the disclosure.

In current systems, a machine-based live text broadcasting method simply provides factual statements for matches, for example: "2015-05-28 10:15:19, WARRIORS® vs. ROCKETS®, Curry, three-point shot, goal." The results of this live broadcasting method are simplistic and dull. Users rarely view such that live broadcasting matches and the quality of live broadcasting is poor. To address the above issue, the disclosed embodiments provide a method for live text broadcasting of a match. The disclosed methods comprise machine-based live text broadcasting methods that include generating real-time utterances for live broadcasting used for describing the current match data with more human-like sentiment according to historical live broadcasting utterances used for describing match data in historical matches with human-like sentiment, thus enabling live text broadcasting for a current match. Because the disclosed embodiments use live broadcasting utterances with human-like sentiment when live broadcasting texts for a current match, the live text broadcasting for a current match simulates a human-like cadence effect, thus improving the quality of the live text broadcasting of a match.

Figure 1:
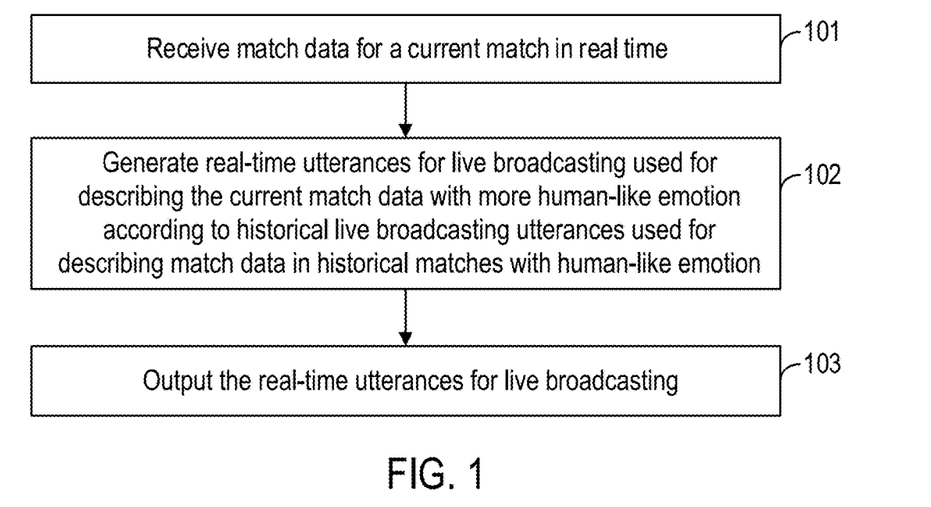
FIG. 1 is a flow diagram illustrating a method for conducting live text broadcasting of a match according to some embodiments of the disclosure.

FIG. 1 is a flow diagram illustrating a method for conducting live text broadcasting of a match according to some embodiments of the disclosure. As shown in FIG. 1, the method includes the following steps.

Step 101: Receive match data for a current match in real time.

Step 102: Generate real-time utterances for live broadcasting used for describing the current match data with more human-like sentiment according to historical live broadcasting utterances used for describing match data in historical matches with human-like sentiment.

Step 103: Output the real-time utterances for live broadcasting.

In this embodiment, match data of a current match is acquired in real time to conduct real-time live broadcasting for the current match. The match data of the current match in this embodiment can be accessed in real time from a viewer of the match or can be provided officially. In this embodiment, whether it is match data of a current match or match data of a historical match, the match data may include the match time, participants of the match, players of the match, match actions, action results, and other information. For example, part of match data for a WARRIORS® vs. ROCKETS® match is described as follows:

2015-05-28 10:15:13, Warriors-Rockets, Curry, passes the ball, Thompson catches the ball.
2015-05-28 10:15:16, Warriors-Rockets, Thompson, passes the ball, Curry catches the ball.
2015-05-28 10:15:19, Warriors-Rockets, Curry, three-point shot, goal.

As can be seen from the above, the match data merely gives factual statements of the match without any sentiment or feeling. Live text broadcasting using the above method, match data, will result in poor broadcasting quality and will not attract viewers.

Therefore, this disclosed embodiments generate real-time utterances for live broadcasting used for describing the current match data with more human-like sentiment according to historical live broadcasting utterances used for describing match data in historical matches with human-like sentiment. The disclosed embodiments further conduct live text broadcasting for a current match by using the real-time utterances for live broadcasting with human-like sentiment. As such, the live broadcasting has an effect of human-like sentiment and cadence, attracting viewers, and thus improving the quality of the live text broadcasting and enhancing the audiences' viewing experience.

The historical live broadcasting utterances may be live broadcasting utterances used during live text broadcasting for historical matches when using a manual live text broadcasting method. Alternatively, the live broadcasting utterances obtained after text transformation of audio data generated during live broadcasting of the historical matches when using a live audio broadcasting method. Alternatively, the live broadcasting utterances obtained after text transformation of video data generated during live broadcasting of the historical matches when using a live video broadcasting method. Generally speaking, live broadcasting utterances used when live text broadcasting is conducted for a match by using a manual live text broadcasting method or live broadcasting utterances obtained after text transformation of data generated by live audio broadcasting or live video broadcasting have human-like sentiments and desirable quality of live broadcasting, as shown in the following:

2015-05-28 10:15:13, Warriors-Rockets, "Curry passes the ball to Thompson"
2015-05-28 10:15:16, Warriors-Rockets, "Thompson dribbles and passes the ball back to Curry"
2015-05-28 10:15:15, Warriors-Rockets, "Curry catches the ball and throws a three-point shot without looking at the basket"
2015-05-28 10:15:17, Warriors-Rockets, "Can he make it!!!"
2015-05-28 10:15:19, Warriors-Rockets, "OMG!!! Clean shot!!!"
2015-05-28 10:15:17, Warriors-Rockets, "Curry shows us the value of an MVP, again!!!"

It should be noted that the manual live text broadcasting requires a lot of human resources and is high in implementation costs. The methods discussed above can achieve the goal of live text broadcasting with human-like sentiments without using human resources. In addition, when live text broadcasting is conducted for a current match using the preceding embodiments, after the method provided in this embodiment is implemented, live broadcasting utterances with human-like sentiment used when live text broadcasting was conducted by using the method in this embodiment previously can further be acquired to serve as historical live broadcasting utterances.

In an alternative embodiment (discussed below), to generate real-time utterances for live broadcasting used for describing the current match data with more human-like sentiment according to historical live broadcasting utterances with human-like sentiment, one embodiment further provides a method for processing live broadcasting utterances for a match in which topics and sentiment grading are marked in advance for historical live broadcasting utterances.

Figure 2:
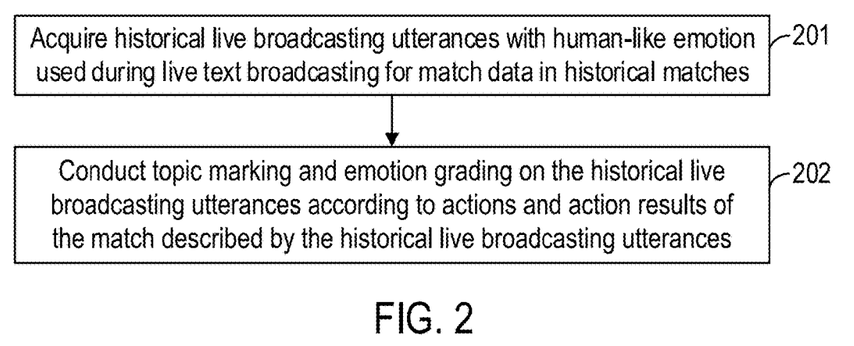
FIG. 2 is a flow diagram illustrating a method for processing live broadcasting utterances for a match according to some embodiments of the disclosure.

FIG. 2 is a flow diagram illustrating a method for processing live broadcasting utterances for a match according to some embodiments of the disclosure. As shown in FIG. 2, the method includes the following steps.

Step 201: Acquire historical live broadcasting utterances with human-like sentiment used during live text broadcasting for match data in historical matches.

For example, live broadcasting utterances used during live text broadcasting for historical matches when using a live text broadcasting method with manual typewriting are acquired and used as the historical live broadcasting utterances here. Alternatively, live broadcasting utterances obtained after text transformation of audio data generated during live broadcasting of the historical matches when using a live audio broadcasting method are acquired and used as the historical live broadcasting utterances here. Alternatively, live broadcasting utterances obtained after text transformation of video data generated during live broadcasting of the historical matches when using a live video broadcasting method are acquired and used as the historical live broadcasting utterances here.

Step 202: Conduct topic marking and sentiment grading on the historical live broadcasting utterances according to actions and action results of the match described by the historical live broadcasting utterances.

In this embodiment, several action topics are set up according to match actions involved in the current match. For example, a basketball match generally includes action topics such as "dribble", "pass", "layup", "dunk", "rebound", and "block shot". Each action topic needs to be described with some keywords. The corresponding live broadcasting utterances under each action topic can be then determined based on these keywords.

Conducting sentiment grading for the historical live broadcasting utterances distinguishes different sentiments shown by different historical live broadcasting utterances. Historical live broadcasting utterances having different sentiment scores express different sentiments. The sentiment scores of the historical live broadcasting utterances can be determined based on action directions and degrees described by the historical live broadcasting utterances. The action direction in fact refers to an action result, such as whether a shot hits or whether the dribble is smooth.

Based on the above, conducting topic marking and sentiment grading for the historical live broadcasting utterances may comprise: parsing the historical live broadcasting utterances to obtain action description words, action direction description words, and action degree description words; marking action topics of the historical live broadcasting utterances according to match actions described by the action description words; and determining sentiment scores of the historical live broadcasting utterances according to action directions described by the action direction description words and action degrees described by the action degree description words.

For example, if a historical live broadcasting utterance is: "Curry's dribble is very smooth." By parsing the historical live broadcasting utterance, the action description word, action direction description word, and action degree description word obtained are "dribble," "smooth," and "very," respectively. It can be seen from the action description word that a match action involved in the historical live broadcasting utterance is dribble, and an action topic of the historical live broadcasting utterance is marked as dribble. Further, sentiment grading is conducted for the historical live broadcasting utterance according to an action direction described by the action direction description word and an action degree described by the action degree description word. A strategy or rule for conducting sentiment grading for the historical live broadcasting utterances may be preset based on the action directions described by the action direction description words and the action degrees described by the action degree description words. Sentiment grading is then conducted for the historical live broadcasting utterances based on the set strategy or rule.

For example, the historical live broadcasting utterances may be graded with sentiment scores ranging from −5 to +5. Assuming that a positive action direction is graded by a positive score ranging from +3 to +5 based on the action degrees. For example, a smooth dribble can be graded by a positive score ranging from +3 to +5 according to the smooth degree. Here, "very smooth" is graded by a score of +4. Assuming that a negative action direction is graded by a negative score ranging from −3 to −5 based on the action degrees. For example, a very unskillful dribble can be graded with a negative score ranging from −3 to −5 based on how the unskillful-dribbling degree. "Very unskillful" can be graded with a score of −4, etc. A result after topic marking and sentiment grading are conducted on the historical live broadcasting utterances is shown as follows:

2015-05-28 10:15:13, Warriors-Rockets, "Curry passes the ball to Thompson", pass, 3 points 2015-05-28 10:15:16, Warriors-Rockets, "Thompson dribbles and passes the ball back to Curry", pass, 3 points 2015-05-28 10:15:19, Warriors-Rockets, "Curry catches the ball and throws a three-point shot without looking at the basket", shoot, 4 points 2015-05-28 10:15:21, Warriors-Rockets, "Can he make it!!!", shoot, 4 points 2015-05-28 10:15:23, Warriors-Rockets, "OMG!!! Clean shot!!!", goal, 5 points 2015-05-28 10:15:25, Warriors-Rockets, "Curry shows us the value of an MVP, again!!!", goal-type comment, 5 points The words such as "pass" and "shoot" after the historical live broadcasting utterances represent action topics, and "3 points", "4 points", and the like represent sentiment scores of the historical live broadcasting utterances. It should be noted that the "goal-type comment" belongs to a comment utterance, which will be described in detail later.

The historical live broadcasting utterances—after being marked with the topics and graded with the sentiment scores—can be put together into a list of live text broadcasting. This list is then outputted to be used for conducting live text broadcasting for a later match.

On the basis of conducting topic marking and sentiment grading for the historical live broadcasting utterances, an implementation of generating real-time utterances for live broadcasting used for describing the current match data with more human-like sentiment according to historical live broadcasting utterances used for describing match data in historical matches with human-like sentiment includes: determining actions and action results in the match data that describes the current match; obtaining, from the historical live broadcasting utterances, historical live broadcasting utterances having sentiments consistent with match data of a current match as historical live broadcasting utterance candidates according to the actions and the action results described by match data of a current match and action topics and sentiment scores of the historical live broadcasting utterances; and modifying the historical live broadcasting utterance candidates to obtain the real-time utterances for live broadcasting.

A strategy or rule can be set. According to the match actions and the action results described by match data of a current match and action topics and sentiment scores of the historical live broadcasting utterances, historical live broadcasting utterances having sentiments consistent with match data of a current match are obtained from the historical live broadcasting utterances based on the set strategy or rule. These obtained historical live broadcasting utterances serve as historical live broadcasting utterance candidates.

For example, in one rule, a pass type action is applicable to live broadcasting utterances in the pass topic having sentiment scores ranging from 1 to 3; a goal type action is applicable to live broadcasting utterances in the shoot topic having sentiment scores ranging from 3 to 5; and a failed shot is applicable to live broadcasting utterances in the shoot topic having sentiment scores ranging from −3 to −5, etc. Based on the above rules, and according to the match actions and the action results described by match data of a current match and action topics and sentiment scores of the historical live broadcasting utterances, one can obtain historical live broadcasting utterances having sentiments consistent with match data of a current match from the historical live broadcasting utterances historical live broadcasting utterances. These obtained historical live broadcasting utterances serve as historical live broadcasting utterance candidates.

After the historical live broadcasting utterance candidates are obtained, the historical live broadcasting utterance candidates may not be directly used as real-time live broadcasting utterances. For example, players involved in the historical live broadcasting utterance candidates may be different from players involved in the match data of the current match. Therefore, the historical live broadcasting utterance candidates can be modified by replacing the players in the historical live broadcasting utterance candidates with the players in the current match. Alternatively, expressions of the historical live broadcasting utterance candidates can be adjusted to obtain more suitable real-time live broadcasting utterances for the current match, such as removing an exclamation point, deleting some words, or adding some words.

In one embodiment, multiple historical live broadcasting utterance candidates having sentiments consistent with the match data of the current match may be acquired. As such, a historical live broadcasting utterance candidate having the highest absolute value of a sentiment score, the highest absolute value of a sentiment score, or having a text representation meeting a preset requirement can be selected from the multiple historical live broadcasting utterance candidates to serve as a target historical live broadcasting utterance. The target historical live broadcasting utterance is then modified so as to obtain the real-time live broadcasting utterance.

For example, regarding the historical live broadcasting utterance candidates having positive sentiments such as goal type actions, a historical live broadcasting utterance candidate having the highest absolute value of a sentiment score can be selected therefrom. For example, regarding the historical live broadcasting utterance candidates having scores ranging from 3 to 5, a historical live broadcasting utterance candidate having a score of 5 is selected therefrom to serve as a target historical live broadcasting utterance.

For example, regarding the historical live broadcasting utterance candidates having negative sentiments such as failed-shot type actions, a historical live broadcasting utterance candidate having the highest absolute value of a sentiment score can be selected therefrom. For example, regarding the historical live broadcasting utterance candidates having scores ranging from −3 to −5, a historical live broadcasting utterance candidate having a score of −5 is selected therefrom to serve as a target historical live broadcasting utterance.

For example, regarding the historical live broadcasting utterance candidates having neutral sentiments such as passing type actions, a historical live broadcasting utterance candidate having the lowest absolute value of a sentiment score can be selected therefrom. For example, regarding the historical live broadcasting utterance candidates having scores ranging from −2 to 2, a historical live broadcasting utterance candidate having a score of 0 is selected therefrom to serve as a target historical live broadcasting utterance.

When a plurality of historical live broadcasting utterance candidates having the highest absolute value of a sentiment score, the lowest absolute value of a sentiment score, or having a text representation meeting a preset requirement exist, randomly selecting one therefrom to serve as a target historical live broadcasting utterance.

If only one historical live broadcasting utterance candidate exists, the historical live broadcasting utterance candidate can be directly modified to obtain the real-time utterance for live broadcasting.

As illustrated, using real-time live broadcasting utterances for live text broadcasting for a current match enables live text broadcasting having an effect of human-like cadence, thus improving the live text broadcasting efficiency and attracting viewers to watch a live match.

Further, in addition to conducting live broadcasting for the current match by using the live broadcasting utterances with human-like sentiment, the method provided in the disclosed embodiments can further comment on the match in real time.

Specifically, real-time commenting utterances with human-like sentiment for real time commenting on the current match can further be generated according to according to historical commenting utterances with human-like sentiment used for real time commenting on the historical matches; and the real-time commenting utterances are outputted to be used for commenting on the match in real time. Therefore, the quality of live broadcasting is further improved; users' interests in live matches are improved; and viewers are attracted to watch the live streamed matches.

A manner of generating the real-time commenting utterances comprises: determining to-be-commented match content for a current match; obtaining, from the historical commenting utterances, historical commenting utterances having sentiments consistent with the match content to serve as historical commenting utterance candidates according to actions and action results involved in the match content and action topics and sentiment scores of the historical commenting utterances; and modifying the historical commenting utterance candidates to obtain the real-time commenting utterances.

In the process of determining the to-be-commented match content for the current match, a time point for comment can be preset; and match data broadcasted before the time point forms the to-be-commented match content. Alternatively, a match scenario that needs a comment can be preset. For example, match data related to goal or fumble can be used as to-be-commented content when each goal, each fumble, successive goals of a team, or successive fumbles of a team, or the like occurs. Alternatively, a designated player such as Thompson (illustrated above) can be set up; and information related to the player is used as to-be-commented match content when match data related to the designated player appears.

Likewise, a strategy or rule can also be set up in the process of selecting historical commenting utterance candidates. Then based on the preset strategy or rule and according to actions and action results involved in the match content and action topics and sentiment scores of the historical commenting utterances, historical commenting utterances having sentiments consistent with the match content are obtained from the historical commenting utterances.

For example, if a comment is provided for successive "goals" or successive "failed shots" of a team; the to-be-commented match content is then content related to the successive "goals" or successive "failed shots". A team having successive goals will have a high sentiment score; and therefore, a strategy or rule can be selecting a historical commenting utterance corresponding to a positive sentiment score ranging from 3 to 5 according to the situation of the current match. A team having non-successive goals is considered normal and neutral in sentiment, and will acquire a historical commenting utterance having a sentiment score ranging from −2 to 2. A team having successive failed shots will have a high negative sentiment; and therefore, a historical commenting utterance having a sentiment score ranging from −3 to −5 can be selected. As can be seen, the specific selection of a historical commenting utterance is actually co-determined by the to-be-commented match content as well as action topics and the global sentiments involved in the match content.

For example, in the above example, "2015-05-28 10:15:25, Warriors-Rockets, "Curry shows us the value of an MVP, again!!!, goal-type comment, 5 points" belongs to a commenting utterance in the live text broadcasting, and the commenting utterance specifically involves a goal-type comment. The action topics and sentiment scores of the historical commenting utterances can also be obtained by topic marking and sentiment grading.

As can be seen, this embodiment conducts live broadcasting for a current match by using live broadcasting utterances with human-like sentiment, and comments on the current match in real time by using commenting utterances with human-like sentiment, thus being conducive to further improving the quality of the live text broadcasting and attracting more viewers to watch live streamed matches.

Further, the method provided in this embodiment further includes: collecting statistics on an information list under each action topic involved in the current match in real time according to the current match data; receiving match questions sent by audiences during the current match; and acquiring answers from corresponding information lists according to action topics involved in the match; and outputting answers for some match of the match questions during an interaction time of the current match. Therefore, interaction with the audiences is implemented, and questions asked by the audiences during the match are answered in real time.

The current match data received in real time can be stored in a live broadcasting database. The live broadcasting database stores all match data related to the current match; and different matches have different types of data. A specific implementation method is as follows: match data in the live broadcasting database is categorized and put into tables according to action topics involved in the current match. For example, for the topic of shots, an information list can be used to store a field goal percentage, a turnover ratio, and the like of each player. For the topic of passes, an information list can be used to store information such as the number of passes during the match for each player, thus facilitating searching for answers for questions raised by the audiences.

For example, assuming that a match question asked by an audience during the current match is: "What is the field goal percentage of Curry up to this point?". The match question asked by the audience can be parsed and it is then determined that the question involves a shot topic; and a background information list is searched for a corresponding result. For example, an answer found for the match question "What is the field goal percentage of Curry up to this point?" is "50%". The process of searching for an answer can be implemented by using search engine architectures such as LUCENE and SOLR in terms of technical implementation, and real-time computing can be implemented by using APACHE STORM, which are not limited in the disclosure.

The interaction with audiences generally occurs when the match has a timeout or is at a half time, suggesting that the interaction time of the current match refers to the time when a match has a timeout or halftime. The time for interaction with audiences is generally limited; yet many match questions are usually raised by the audiences. As a result, not all the match questions can be answered and therefore, some match questions can be adaptively selected to be answered. The most basic selection manner is: selecting the most popular match questions for display. For example, a Word2Vec model can be used to cluster the match questions and answers. The category having the largest number of interactions is selected; and one or more match questions are extracted from the category to be answered. Based on a duration of the interaction time, different quantities of match questions can be answered per the popularity rates.

As can be seen, the method for conducting live text broadcasting of a match provided in the disclosed embodiments conducts live text broadcasting for a current match by using live broadcasting utterances with human-like sentiment, and comments on the current match in real time by using commenting utterances with human-like sentiment. Meanwhile, interaction with audiences is also supported by answering match questions asked by the audiences. Therefore, the quality of live text broadcasting is improved, and the viewers' experience in watching the live broadcasting match is also improved. A live text broadcasting is provided without involving a manual processing, thus reducing costs and improving the efficiency.

It should be noted that to briefly describe each foregoing method embodiment, all the method embodiments are expressed as a combination of a series of actions; but those skilled in the art should know that the present disclosure is not limited by the sequence of the described actions. Certain steps can be applied with different sequences or can be carried out at the same time according to the disclosure. Secondly, those skilled in the art should also know that all the embodiments described in the description belong to preferred embodiments; the related actions and modules are not necessarily needed for the disclosure.

In the embodiments, the description of each embodiment has its own focus; and references for those that are not described in detail in a certain embodiment can be made by referring to the related descriptions of other embodiments.

Figure 3:
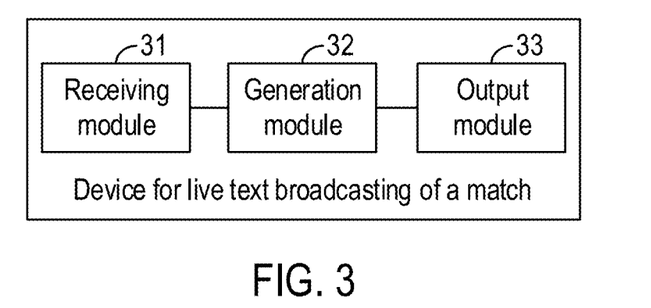
FIG. 3 is a block diagram illustrating a device for conducting live text broadcasting of a match according to some embodiments of the disclosure.

FIG. 3 is a block diagram illustrating a device for conducting live text broadcasting of a match according to some embodiments of the disclosure. As shown in FIG. 3, the device includes: a receiving module 31, a generation module 32, and an output module 33.

The receiving module 31 is configured to receive match data for a current match in real time.

The generation module 32 is configured to generate real-time utterances for live broadcasting used for describing the current match data received by the receiving module 31 with more human-like sentiment according to historical live broadcasting utterances used for describing match data in historical matches with human-like sentiment.

The output module 33 is configured to output the real-time live broadcasting utterances generated by the generation module 32.

In one embodiment, the generation module 32 can specifically be configured to: determine actions and action results included in the match data for the current match; obtain, from the historical live broadcasting utterances, historical live broadcasting utterances having sentiments consistent with match data of a current match as historical live broadcasting utterance candidates according to the actions and the action results described by match data of a current match and action topics and sentiment scores of the historical live broadcasting utterances; and modify the historical live broadcasting utterance candidates to obtain the real-time utterances for live broadcasting.

Further, when modifying the historical live broadcasting utterance candidates to obtain the real-time live utterances for live broadcasting, the generation module 32 can be configured to: when a plurality of historical live broadcasting utterance candidates are obtained, select therefrom a historical live broadcasting utterance candidate either having the highest absolute value of a sentiment score, the lowest absolute value of a sentiment score, or having a text representation meeting a preset requirement to serve as a target historical live broadcasting utterance; and modify the target historical live broadcasting utterance to obtain the real-time utterance for live broadcasting.

For example, regarding the historical live broadcasting utterance candidates having positive sentiments such as goal type actions, a historical live broadcasting utterance candidate having the highest absolute value of a sentiment score can be selected therefrom. For example, regarding the historical live broadcasting utterance candidates having scores ranging from 3 to 5, a historical live broadcasting utterance candidate having a score of 5 is selected therefrom to serve as a target historical live broadcasting utterance.

For example, regarding the historical live broadcasting utterance candidates having negative sentiments such as failed-shot type actions, a historical live broadcasting utterance candidate having the highest absolute value of a sentiment score can be selected therefrom. For example, regarding the historical live broadcasting utterance candidates having scores ranging from −3 to −5, a historical live broadcasting utterance candidate having a score of −5 is selected therefrom to serve as a target historical live broadcasting utterance.

For example, regarding the historical live broadcasting utterance candidates having neutral sentiments such as passing type actions, a historical live broadcasting utterance candidate having the lowest absolute value of a sentiment score can be selected therefrom. For example, regarding the historical live broadcasting utterance candidates having scores ranging from −2 to 2, a historical live broadcasting utterance candidate having a score of 0 is selected therefrom to serve as a target historical live broadcasting utterance.

When a plurality of historical live broadcasting utterance candidates having the highest absolute value of a sentiment score, the lowest absolute value of a sentiment score, or having a text representation meeting a preset requirement exist, randomly selecting one therefrom to serve as a target historical live broadcasting utterance.

In an optional implementation manner, the generation module 32 is further configured to generate real-time commenting utterances with human-like sentiment for real time commenting on the current match according to historical commenting utterances with human-like sentiment used for real time commenting on the historical matches. Accordingly, the output module 33 is further configured to output the real-time commenting utterances generated by the generation module 32.

In one embodiment, when generating real-time commenting utterances with human-like sentiment for real time commenting on the current match according to historical commenting utterances with human-like sentiment used for real time commenting on the historical matches, the generation module 32 can specifically be configured to: determine to-be-commented match content for the current match; obtain, from the historical commenting utterances, historical commenting utterances having sentiments consistent with the match content to serve as historical commenting utterance candidates according to actions and action results involved in the match content and action topics and sentiment scores of the historical commenting utterances; and modify the historical commenting utterance candidates to obtain the real-time commenting utterances.

In an alternative embodiment (shown in FIG. 4) the device further includes a statistic module 34 and an interaction module 35.

Figure 4:
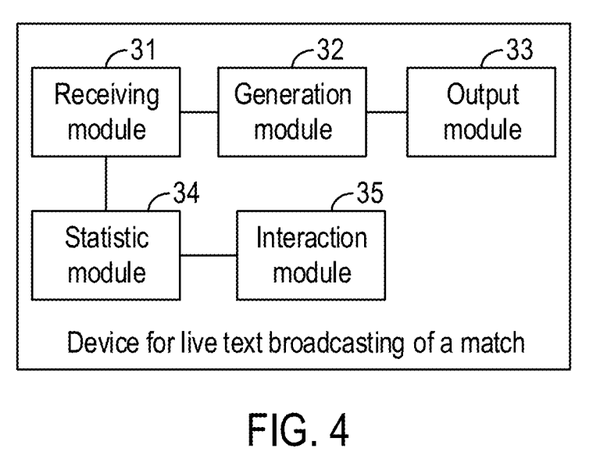
FIG. 4 is a block diagram illustrating a device for conducting live text broadcasting of a match according to some embodiments of the disclosure.

The statistic module 34 is configured to collect real time statistics on information lists for each action topic involved in the current match according to the current match data.

The interaction module 35 is configured to receive match questions sent by audiences during the current match, and acquire answers from corresponding information lists according to action topics involved in the match questions, and output answers for some of the match questions during an interaction time of the current match.

The device for conducting live text broadcasting of a match provided in the embodiment illustrated in FIG. 4 enables live text broadcasting for a current match by receiving match data for a current match in real time; generating real-time utterances for live broadcasting used for describing the current match data with more human-like sentiment according to historical live broadcasting utterances used for describing match data in historical matches with human-like sentiment, and outputting the real-time live broadcasting utterances. Because the device of this embodiment uses live broadcasting utterances with human-like sentiment, the live text broadcasting for a current match is provided with human-like cadence effect, thus improving the quality of the live text broadcasting of a match.

Figure 5:
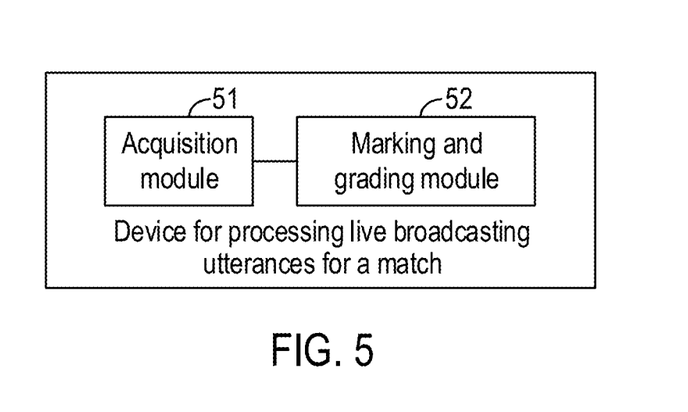
FIG. 5 is a block diagram illustrating a device for processing live broadcasting utterances for a match according to some embodiments of the disclosure.

FIG. 5 is a block diagram illustrating a device for processing live broadcasting utterances for a match according to some embodiments of the disclosure. As shown in FIG. 5, the device includes: an acquisition module 51 and a marking and grading module 52.

The acquisition module 51 is configured to acquire historical live broadcasting utterances with human-like sentiment used during live text broadcasting for match data in historical matches.

The marking and grading module 52 is configured to conduct topic marking and sentiment grading on the historical live broadcasting utterances according to actions and action results of the match described by the historical live broadcasting utterances acquired by the acquisition module 51.

In an alternative embodiment, the acquisition module 51 is specifically configured to acquire live broadcasting utterances used during live text broadcasting for the historical matches when using a live text broadcasting method with manual typewriting and use the acquired live broadcasting utterances as the historical live broadcasting utterances.

In an alternative embodiment, the acquisition module 51 is specifically configured to acquire live broadcasting utterances obtained after text transformation of audio data generated during live broadcasting of the historical matches when using a live audio broadcasting method, and using the acquired live broadcasting utterances as the historical live broadcasting utterances.

In an alternative embodiment, the acquisition module 51 is specifically configured to acquire live broadcasting utterances obtained after text transformation of video data generated during live broadcasting of the historical matches when using a live video broadcasting method, and using the acquired live broadcasting utterances as the historical live broadcasting utterances.

In an alternative embodiment, the marking and grading module 52 is specifically configured to: parse the historical live broadcasting utterances to obtain action description words, action direction description words, and action degree description words; mark action topics of the historical live broadcasting utterances according to match actions described by the action description words; and determine sentiment scores of the historical live broadcasting utterances according to action directions described by the action direction description words and action degrees described by the action degree description words.

The device for processing live broadcasting utterances for a match provided in this embodiment is used for conducting topic marking and sentiment grading on historical live broadcasting utterances to clearly understand action topics and sentiment scores of the historical live broadcasting utterances, thus providing the device the needed conditions for conducting live text broadcasting for the match. As such, the device for conducting live text broadcasting of a match can generate live broadcasting utterances with human-like sentiment for live broadcasting the current match.

For a convenient and concise description, references of the specific working processes of the systems, the device, and the units described above can be made by referring to the corresponding processes in the foregoing method embodiments; they are not repeated herein.

In the several embodiments provided by the disclosure, it should be understood that the disclosed systems, apparatuses, and methods can be implemented in other ways. For example, the device embodiment described above is merely schematic. For example, the division of the units is merely a logical function division; other division methods in practical implementation may exist, like a plurality of units or components can be combined or can be integrated into another system; or some features can be ignored or are not executed. From another point, the intercoupling, direct coupling, or communication connection displayed or discussed may be electrical, mechanical or other forms through some interfaces, indirect coupling or communication connection of the device or the units.

The units described as separate parts may or may not be physically separated; and the parts shown as units may or may not be physical units, which may be located in one place or may be distributed onto a plurality of network units. The objective of the solution of the disclosed embodiments may be implemented by selecting a part of or all the units according to actual requirements.

In addition, various functional units in the disclosed embodiments may be integrated in one processing unit, or the units exist physically and separately, or two or more units are integrated in one unit. The integrated unit may be implemented by using hardware, and may also be implemented in a form of hardware plus software functional units.

The integrated unit implemented in the form of a software functional unit may be stored in a computer readable storage medium. The software functional unit is stored in a storage medium, and includes several instructions that enable a computer device (which may be a personal computer, a server, a network device or the like) or a processor to execute partial steps of the method in the disclosed embodiments. The foregoing storage medium includes various media capable of storing program code, including a USB flash disk, a mobile hard disk, a Read-Only Memory (ROM), a Random Access Memory (RAM), a magnetic disk, an optical disc, or the like.

It should be finally noted that the above embodiments are merely used for illustrating rather than limiting the technical solutions of the disclosed embodiments. Although the disclosure is described in detail with reference to the foregoing embodiments, those of ordinary skill in the art should understand that the technical solutions recorded in the foregoing embodiments may still be modified or equivalent replacement may be made on partial technical features therein. These modifications or replacements will not make the essence of the corresponding technical solutions be departed from the spirit and scope of the technical solutions in the disclosed embodiments.

The invention claimed is:

1. A method comprising:
receiving, by a processor, match data for a match that is currently under way, the match data comprising a current utterance associated with a current action;
retrieving, by the processor, a set of historical live broadcasting utterances associated with live text broadcasting for a historical match, each utterance in the live broadcasting utterances associated with an action;
identifying, by the processor, a matching live broadcasting utterance in the set of historical live broadcasting utterances based on the action of the current utterance and an action of a respective live broadcasting utterance in the set of historical live broadcasting utterances;
generating, by the processor, a modified utterance for the current utterance based on the matching live broadcasting utterance; and
outputting, by the processor, the modified utterance for live broadcasting.

2. The method of claim 1, the generating a modified utterance further comprising:
extracting, by the processor, an action result included in the current utterance;
obtaining, by the processor and from the set of historical live broadcasting utterances, utterances having sentiments similar to the match data as historical live broadcasting utterance candidates according to the action and the action result included in the match data and action topics and sentiment scores of the set of historical live broadcasting utterances; and
modifying, by the processor, the historical live broadcasting utterance candidates to obtain the modified utterance for live broadcasting.

3. The method of claim 2, the modifying the historical live broadcasting utterance candidates comprising:
when the historical live broadcasting utterance candidates are obtained, selecting, by the processor, a historical live broadcasting utterance candidate either having a highest absolute value of a sentiment score, having a lowest absolute value of a sentiment score, or having a text representation meeting a preset requirement as a target historical live broadcasting utterance; and
modifying, by the processor, the target historical live broadcasting utterance to obtain the modified utterance for live broadcasting.

4. The method of claim 2, further comprising:
collecting, by the processor, real time statistics on information lists for each action topic in the action topics;
receiving, by the processor, match questions sent by audiences during the current match, and acquiring answers from corresponding information lists associated with the action topics; and
outputting, by the processor, answers for at least one of the match questions during an interaction time of the current match.

5. The method of claim 1, the retrieving a set of historical live broadcasting utterances further comprising one or more of:
retrieving, by the processor, live broadcasting utterances used during live text broadcasting for the historical matches when using a live text broadcasting method with manual typing;
retrieving, by the processor, live broadcasting utterances obtained after text transformation of audio data generated during live broadcasting of the historical matches when using a live audio broadcasting method; or
retrieving, by the processor, live broadcasting utterances obtained after text transformation of video data generated during live broadcasting of the historical matches when using a live video broadcasting method.

6. The method of claim 1, further comprising conducting, by the processor, topic marking and sentiment grading on the set of historical live broadcasting utterances according to actions and action results included in the set of historical live broadcasting utterances.

7. The method of claim 6, the conducting topic marking and sentiment grading on the set of historical live broadcasting utterances according to actions and action results of the match described by the set of historical live broadcasting utterances comprising:
parsing, by the processor, the set of historical live broadcasting utterances to obtain action description words, action direction description words, and action degree description words;
marking, by the processor, action topics of the set of historical live broadcasting utterances according to match actions described by the action description words; and
determining, by the processor, sentiment scores of the set of historical live broadcasting utterances according to action directions described by the action direction description words and action degrees of the action degree description words.

8. The method of claim 7, the parsing the set of historical live broadcasting utterances comprising extracting, by the processor, action topics using a set of pre-defined keywords associated with a type of a historical live broadcast represented by the set of historical live broadcasting utterances.

9. The method of claim 6, the conducting topic marking and sentiment grading on the set of historical live broadcasting utterances comprising assigning, by the processor, an integer value to each utterance in the set of historical live broadcasting utterances.

10. The method of claim 9, the assigning an integer value to each utterance in the set of historical live broadcasting utterances comprising assigning, by the processor, a negative value if a respective utterance represents a negative sentiment and a positive value if the utterance represents a positive sentiment.

11. An apparatus comprising:
a processor; and
a non-transitory storage medium for tangibly storing thereon program logic for execution by the processor, the stored program logic comprising:
logic, executed by the processor, for receiving match data for a match that is currently under way, the match data comprising a current utterance associated with a current action;
logic, executed by the processor, for retrieving a set of historical live broadcasting utterances associated with live text broadcasting for a historical match, each utterance in the live broadcasting utterances associated with an action;
logic, executed by the processor, for identifying a matching live broadcasting utterance in the set of historical live broadcasting utterances based on the action of the current utterance and an action of a respective live broadcasting utterance in the set of historical live broadcasting utterances;
logic, executed by the processor, for generating a modified utterance for the current utterance based on the matching live broadcasting utterance; and
outputting the modified utterance for live broadcasting.

12. The apparatus of claim 11, the logic for generating a modified utterance further comprising:
logic, executed by the processor, for extracting an action result included in the current utterance;
logic, executed by the processor, for obtaining, from the set of historical live broadcasting utterances, utterances having sentiments similar to the match data as historical live broadcasting utterance candidates according to the action and the action result included in the match data and action topics and sentiment scores of the set of historical live broadcasting utterances; and
logic, executed by the processor, for modifying the historical live broadcasting utterance candidates to obtain the modified utterance for live broadcasting.

13. The apparatus of claim 12, the logic for modifying the historical live broadcasting utterance candidates comprising:
logic, executed by the processor, for when the historical live broadcasting utterance candidates are obtained, selecting a historical live broadcasting utterance candidate either having a highest absolute value of a sentiment score, having a lowest absolute value of a sentiment score, or having a text representation meeting a preset requirement as a target historical live broadcasting utterance; and
logic, executed by the processor, for modifying the target historical live broadcasting utterance to obtain the modified utterance for live broadcasting.

14. The apparatus of claim 12, further comprising:
logic, executed by the processor, for collecting real time statistics on information lists for each action topic in the action topics;
logic, executed by the processor, for receiving match questions sent by audiences during the current match, and acquiring answers from corresponding information lists associated with the action topics; and
logic, executed by the processor, for outputting answers for at least one of the match questions during an interaction time of the current match.

15. The apparatus of claim 11, the logic for retrieving a set of historical live broadcasting utterances further comprising one or more of:
logic, executed by the processor, for retrieving live broadcasting utterances used during live text broadcasting for the historical matches when using a live text broadcasting method with manual typing;

logic, executed by the processor, for retrieving live broadcasting utterances obtained after text transformation of audio data generated during live broadcasting of the historical matches when using a live audio broadcasting method; or logic, executed by the processor, for retrieving live broadcasting utterances obtained after text transformation of video data generated during live broadcasting of the historical matches when using a live video broadcasting method.

16. The apparatus of claim 11, further comprising logic, executed by the processor, for conducting topic marking and sentiment grading on the set of historical live broadcasting utterances according to actions and action results included in the set of historical live broadcasting utterances.

17. The apparatus of claim 16, the logic for conducting topic marking and sentiment grading on the set of historical live broadcasting utterances according to actions and action results of the match described by the set of historical live broadcasting utterances comprising:

logic, executed by the processor, for parsing the set of historical live broadcasting utterances to obtain action description words, action direction description words, and action degree description words;

logic, executed by the processor, for marking action topics of the set of historical live broadcasting utterances according to match actions described by the action description words; and logic, executed by the processor, for determining sentiment scores of the set of historical live broadcasting utterances according to action directions described by the action direction description words and action degrees of the action degree description words.

18. The apparatus of claim 17, the logic for parsing the set of historical live broadcasting utterances comprising logic, executed by the processor, for extracting action topics using a set of pre-defined keywords associated with a type of a historical live broadcast represented by the set of historical live broadcasting utterances.

19. The apparatus of claim 16, the logic for conducting topic marking and sentiment grading on the set of historical live broadcasting utterances comprising logic, executed by the processor, for assigning an integer value to each utterance in the set of historical live broadcasting utterances.

20. The apparatus of claim 19, the logic for assigning an integer value to each utterance in the set of historical live broadcasting utterances comprising logic, executed by the processor, for assigning a negative value if a respective utterance represents a negative sentiment and a positive value if the utterance represents a positive sentiment.

* * * * *